United States Patent
Hänninen

(10) Patent No.: US 7,222,698 B2
(45) Date of Patent: May 29, 2007

(54) ELEVATOR ARRANGEMENT

(75) Inventor: Ari Hänninen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/451,543

(22) Filed: Jun. 13, 2006

(65) Prior Publication Data

US 2007/0000735 A1   Jan. 4, 2007

Related U.S. Application Data

(63) Continuation of application No. PCT/FI2005/000001, filed on Jan. 3, 2005.

(51) Int. Cl.
*B66B 1/34* (2006.01)
(52) U.S. Cl. .................................. 187/393
(58) Field of Classification Search ............. 187/247, 187/248, 391–397; 700/83; 340/3.42–3.44; 702/179–185
See application file for complete search history.

(56) References Cited

U.S. PATENT DOCUMENTS

| | | | |
|---|---|---|---|
| 3,838,891 A * | 10/1974 | Hamelin | 303/122.08 |
| 4,002,973 A * | 1/1977 | Wiesendanger et al. | 187/391 |
| 4,627,518 A | 12/1986 | Meguerdichian | |
| 5,233,139 A * | 8/1993 | Hofmann | 187/393 |
| 5,578,801 A * | 11/1996 | Hofmann | 187/393 |
| 6,325,179 B1 * | 12/2001 | Barreiro et al. | 187/393 |
| 7,004,289 B2 * | 2/2006 | Shrum et al. | 187/393 |

FOREIGN PATENT DOCUMENTS

| | | |
|---|---|---|
| DE | 42 17 587 C1 | 6/1993 |
| DE | 44 44 466 C1 | 4/1996 |
| EP | 0 338 777 A2 | 10/1989 |

* cited by examiner

*Primary Examiner*—Jonathan Salata
(74) *Attorney, Agent, or Firm*—Birch, Stewart, Kolasch & Birch, LLP

(57) ABSTRACT

The present invention relates to a method and a system for testing the condition of the brakes of an elevator. In the method, a test weight is set to apply to the drive machine of the elevator, by means of which weight a first torque required for driving the elevator car in the upward direction is measured. At least one of the brakes of the elevator is closed. Next, the empty elevator car is driven in the upward direction with the force of the aforesaid first torque and a check is carried out to detect movement of the elevator car. If a movement of the elevator car is detected, then the aforesaid at least one brake of the elevator is regarded as defective. The method of the present invention makes it possible to check the operativeness of the brakes of the elevator without separate maintenance visits.

12 Claims, 3 Drawing Sheets

ELEVATOR ARRANGEMENT

This application is a Continuation of copending PCT International Application No. PCT/FI2005/000001 filed on Jan. 3, 2005, which designated the United States, and on which priority is claimed under 35 U.S.C. § 120. The entire contents of each of the above documents is hereby incorporated by reference.

FIELD OF THE INVENTION

The present invention relates to elevator safety systems and the brake equipment of elevator cars.

BACKGROUND OF THE INVENTION

An important aim in elevator systems is to maximize passenger safety. Free fall of the elevator car must be prevented and the motion must not reach an uncontrolled acceleration and consequent uncontrolled deceleration of motion. Sudden stops occurring even with a relatively low kinetic energy may cause injuries to passengers.

FIG. 1 illustrates a prior-art roped elevator system and associated common prior-art safety devices. The basic parts constituting the elevator system are an elevator shaft 100, an elevator car 102 traveling in it, ropes 116–120 connected to the elevator car, a traction sheave 106 and a counterweight 104. The counterweight is so designed that its weight corresponds to the weight of the elevator car 102 and the weight of the associated mechanical equipment on the car side plus half the weight of the nominal load. With this arrangement, the weight difference between the car and counterweight sides is half the nominal load, unless the elevator car is overloaded. Nominal load refers to the load carried in the elevator car. Extending on the side or back walls of the elevator shaft are at least two guide rails 122, 124, the function of which is to keep the elevator car in position in the frontways and backways directions in relation to the counterweight. In the figure, the elevator car is provided with safety gears 154–156, which have brake shoes that safety gears 154–156, which have brake shoes that brake the car by gripping the guide rails 122 and 124. The traction sheave 106 is connected by an axle 107 to a power transmission means 109, which may also contain a gear system. In this case, the elevator machine is a geared machine. The elevator machine may also be gearless. Connected by an axle 108 to the power transmission means 109 is a motor 110. The motor 110 is controlled by a control system 114 over a control cable 112. The motor may be a single-speed, dual-speed or variable-speed motor. The control system 114 may control the motor torque in a stepless manner e.g. by a control arrangement based on variable voltage and variable frequency (V3F). Also connected to the control system 114 are systems for handling car calls and button control. The axle 108 is provided with brakes 160–162, which have brake drums for braking the axle 108. The brakes 160–162 are connected to the control system 114 via a control cable 111. The traction sheave is equipped with a motion measuring device 115, which is e.g. a tachometer. The motion measuring device 115 is connected to the control unit by a cable 116.

The authorities in different countries have different regulations concerning the safety of elevators. The basic principle is that the brake system of the elevator should be able to stop the elevator car from the nominal speed and keep it immovable at a floor even in overload situations, where the elevator car has an excessive load. The brake system should have a fault tolerance such that one mechanical fault will not make the brake system completely inoperative.

For example, according to European safety regulation EN81-1:1998 the brake must be mechanically doubled so that when one part fails, the other half of the brake is still operative. A mechanically doubled brake must be able to stop a 125-% load moving downwards at nominal speed. Nominal speed refers to the maximum speed of motion that can be reached by the motor of the machine.

The condition and operation of the brakes of an elevator are generally only tested in connection with maintenance visits. In the case of single- and dual-speed elevators, the condition of the brakes can be detected from an impaired stopping accuracy. In the case of variable-speed elevators employing electronic adjustment, operativeness of the brakes can not be so easily detected because the brakes do not necessarily have a significant effect on stopping accuracy. For this reason, the operativeness of the brakes of variable-speed elevators is completely dependent on the maintenance program. It is additionally possible that the elevator serviceman adjusts the brakes incorrectly to reduce the disturbing noise produced by the brakes. However, the operation of the brakes is of primary importance for reasons of safety. Due to the aforesaid circumstances, maintenance of the brakes of elevators requires considerable carefulness and it has a significant effect on safety.

OBJECT OF THE INVENTION

The object of the present invention is to ensure the operativeness of the brakes of an elevator system by an automatic method and to make sure that the brakes meet the above-mentioned safety regulations even between the periodic inspections of the elevator system.

As for the features of the invention, reference is made to the claims.

BRIEF DESCRIPTION OF THE INVENTION

The invention concerns a method for testing the condition of the brakes of an elevator. In the method, a test weight is set to apply to the drive machine of the elevator to measure a first torque required for driving the elevator car in the upward direction; at least one of the brakes of the elevator is closed; the empty elevator car is driven in the upward direction with the force of the aforesaid first torque; a check is carried out to detect movement of the elevator car; and if a movement of the elevator car is detected, then the aforesaid at least one brake of the elevator is regarded as defective.

The invention also relates to a system for testing the condition of the brakes of an elevator, which system further comprises a control system for measuring a first torque required to drive the elevator in the upward direction in a defined start-up situation, storing the aforesaid first torque, closing the brake of the elevator, driving the elevator car in the upward direction with the force of the aforesaid first torque; and measuring means for checking movement of the elevator car, said means being connected to the aforesaid control system.

In an embodiment of the invention, a second torque required for driving the elevator car in the upward direction in a defined start-up situation is measured; a third torque for moving the elevator car in the upward direction is measured at prescribed intervals; the aforesaid second torque is compared to the aforesaid third torque; and if the aforesaid third torque exceeds the aforesaid second torque by a threshold value, then the elevator is regarded as defective.

In an embodiment of the invention, the system further comprises a control system for measuring a second torque required to drive the elevator in the upward direction in a defined start-up situation, measuring a third torque required to drive the elevator car in the upward direction in a testing situation, storing the aforesaid second and third torques, comparing the aforesaid second and third torques and indicating a defective condition of the elevator if the third torque exceeds the aforesaid second torque by a threshold value.

In an embodiment of the invention, the testing situation is repeated automatically at prescribed intervals when the elevator is empty. Start-up situation refers e.g. to installation of the elevator or renewal of the electrification system of the elevator. Start-up situation also refers to regular maintenance during which the measurement of the torques is performed. A start-up situation and the associated measurements of the first and second torques are started e.g. by means of a user interface separately connected to the control system. In this way, the control system can distinguish between situations where the elevator is loaded with a test weight and situations where the elevator is empty for measurement of the second torque.

In an embodiment of the invention, the testing of the brakes is performed at prescribed intervals when the elevator is in use for transport. The testing is carried out when the elevator is empty. This testing of the brakes comprises e.g. the following steps: the elevator is driven to a testing floor, the brake of the elevator is closed, the elevator car is driven in the upward direction with the force of a first torque, a check is carried out to detect movement of the elevator car, and if a movement of the elevator car is detected, then the at least one brakes of the elevator is regarded as defective. As a consequence of the elevator being regarded as defective, for example, the elevator is disabled and a notice is sent to the maintenance center. The prescribed interval corresponds e.g. to a given number of starts of the drive machine. In an embodiment of the invention, dragging of the brakes is checked in the same connection.

In an embodiment of the invention, the drive machine, especially the motor, is electronically adjustable or otherwise capable of speed variation. The electronic adjustment is based e.g. on V3F control.

In a preferred embodiment of the invention, a threshold value by which the third torque must exceed the second torque for the elevator to be regarded as defective can be defined in the control system of the elevator by maintenance personnel. Alternatively, the threshold value is fixedly defined in the control system of the elevator.

The advantages of the invention are related to improved safety. Checking the condition of the brakes at regular intervals even outside maintenance visits considerably reduces the risk of uncontrolled starting. In addition, regular measurement of the torque required for moving the elevator car at normal speed brings savings in the energy consumption of the elevator because a partly blocked brake can not necessarily be detected without an accurate torque measurement.

LIST OF FIGURES

DETAILED DESCRIPTION OF THE INVENTION

Figure 1:
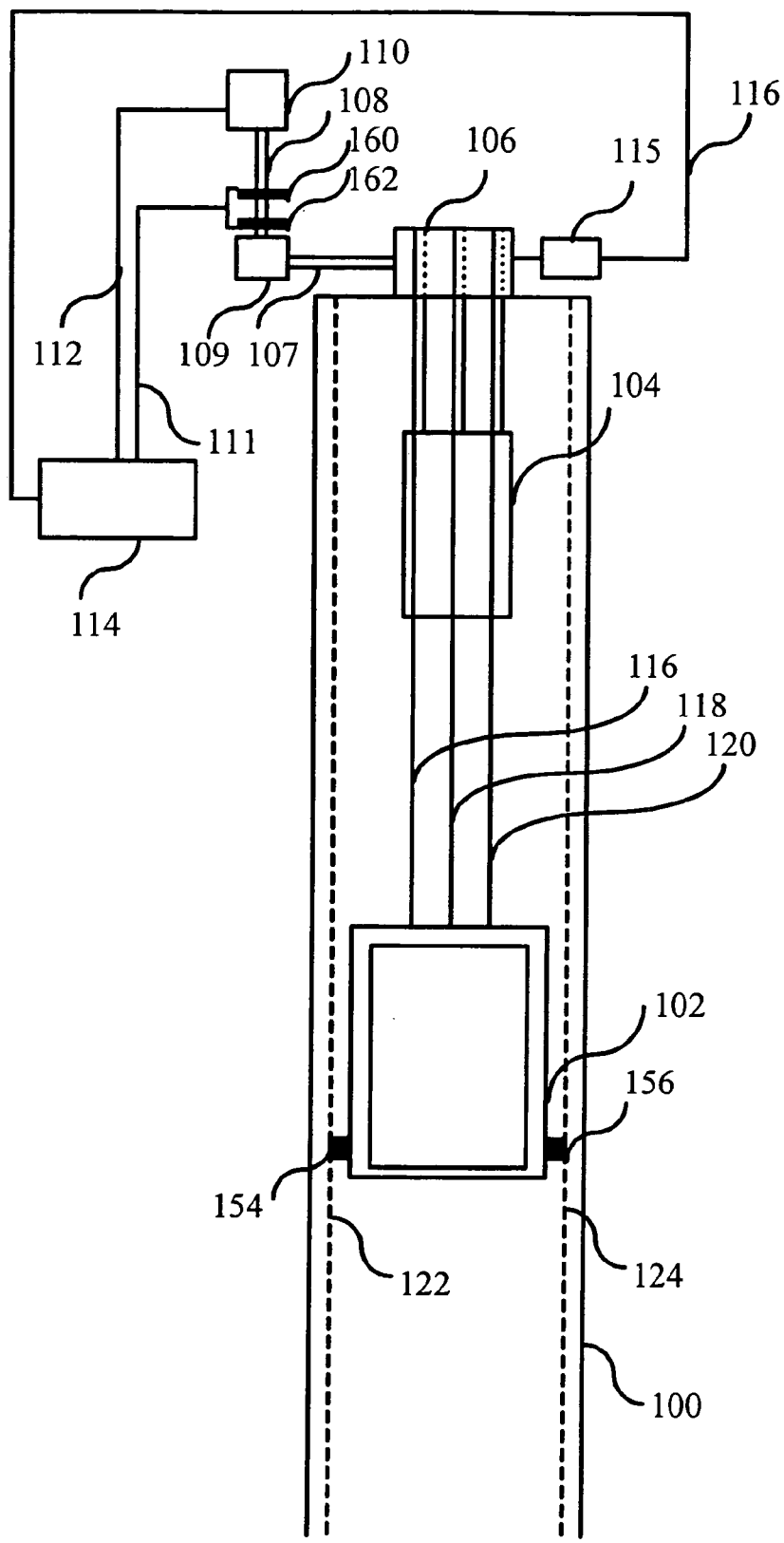
FIG. 1 represents a prior-art elevator system.
Figure 2:
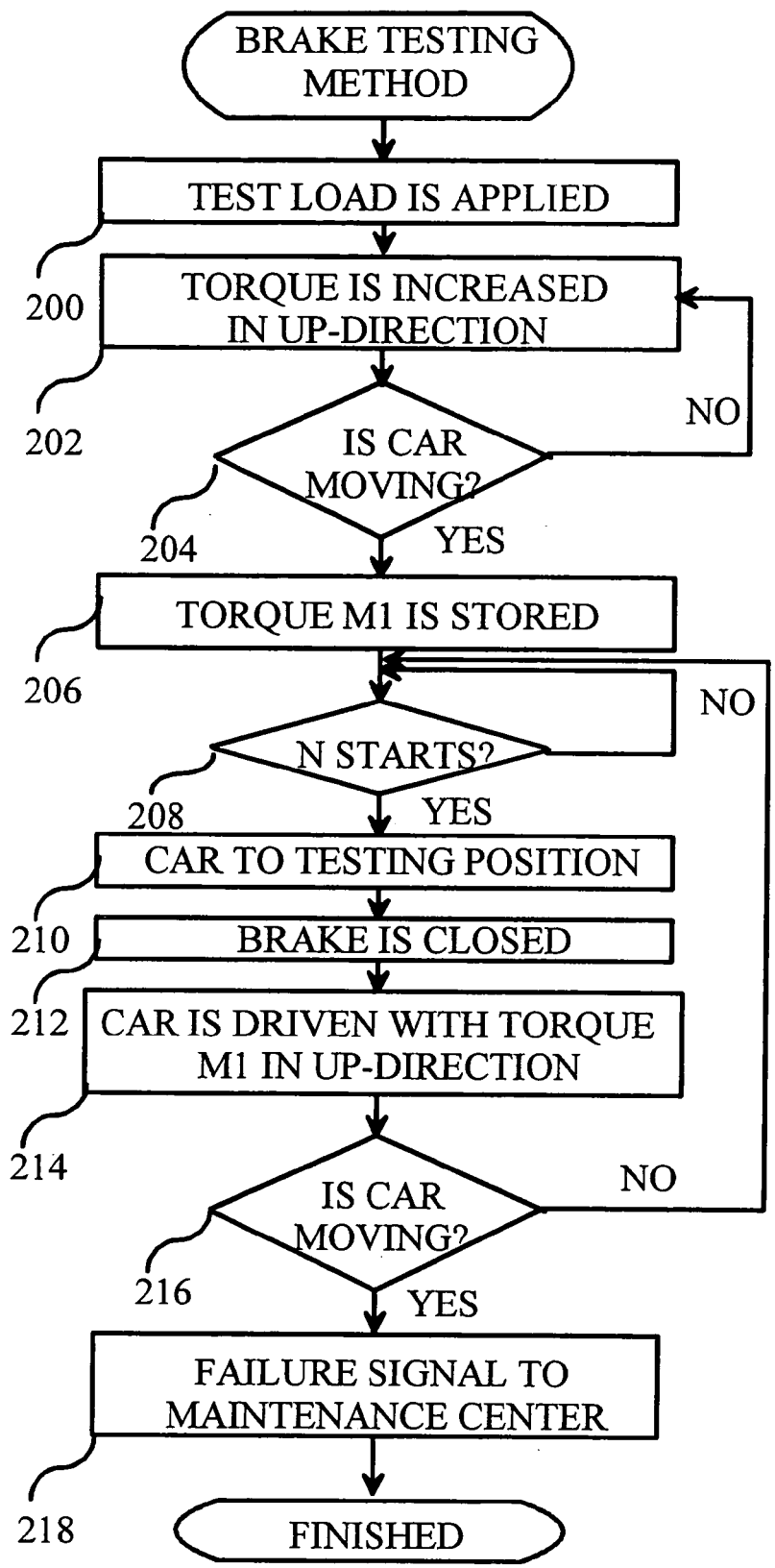
FIG. 2 represents a method according to the present invention for testing the grip of the brakes of an elevator machine.

FIG. 2 presents an example of the method of the invention for testing the brakes of an elevator machine. In an embodiment of the invention, the elevator system to be tested is as illustrated in FIG. 1.

In step 200, a predefined test load is set to apply to the drive machine of the elevator. In practice, this test load is set e.g. by loading the elevator car with test weights whose weight is sufficiently reliably known. The weight of the test load depends on the amount of overload that the elevator brakes are required to tolerate. In an embodiment of the invention, the elevator brakes are required to withstand a 125-% overload. In this case, the test load must be 75 of the nominal load of the elevator. If the elevator brakes are required to withstand an overload of P %, then the test load must be 50%+P %.

In step 202, the torque of the motor 110 is increased until it is established in step 204 that the car starts moving. In step 206, the motor's 110 torque value that caused to car to start moving is measured and stored in memory. This measured torque value is designated by variable M1. This torque value M1 is stored in the memory of the control system 114 of the elevator. In an embodiment of the invention, the measured torque value M1 is compared to a basic value already stored in the control system 114, from which value the measured torque value M1 must not differ significantly. The torque value M1 may differ significantly from the basic value e.g. if the brake of the elevator is in the closed state during the measurement or if an incorrect amount of test load has been loaded. If the value M1 differs significantly from the basic value, then the measurement will be regarded as a failure and the start-up process can not be continued.

The above-mentioned torque M1 can be calculated either in conjunction with manufacture of the elevator apparatus or when the elevator apparatus is being installed in the client's premises or in conjunction with a renewal of the electrification system of an elevator apparatus already installed in the client's premises. It is possible to calculate the torque in conjunction with manufacture if it can be established that for example the weight of the elevator car 102 and counterweight 104 and the transmission properties of the motor 110, the axles 107–108 and the traction sheave 106 will remain sufficiently unchanged when installed in the client's premises. Calculation of the torque during start-up in the client's premises is necessary especially if a new control system 114 and a new motor 110 are installed in an existing system consisting of an elevator shaft, an elevator car and a counterweight.

In step 208, the system is checked to establish whether the elevator car 102 has been started N times. 'Start' means starting the motor 110 to enable the elevator car to be moved from a given floor to another e.g. to serve a car call issued by a user. The number N may be e.g. 1000 or another corresponding number representing a prescribed period at intervals of which the condition of the brakes is to be automatically tested. This prescribed period can be input to the control system 114 either at factory or in connection with maintenance. In an embodiment of the invention, the test can also be carried out at certain intervals based e.g. on a timer or a clock device connected to the control system 114. If it is established in step 204 that the car has not yet been started N times, the procedure is resumed again from step 208, awaiting the next start. After N starts have been performed, the procedure goes on to step 210. In an embodiment of the invention, an additional check is carried out to establish whether the elevator car is free of passengers. This check is performed by means of e.g. a load-weighing device or light cells mounted in the car.

In step 210, the doors of the elevator car are closed and the elevator car is driven to a testing position, e.g. to the lowest floor. In step 212, the brakes of the elevator, e.g. brakes 160–162 are closed. In step 214, the torque of the motor 110 is increased to move the elevator car in the upward direction until it corresponds to torque value M1, in other words, an elevator overload situation is simulated. This is accomplished e.g. using V3F control by increasing the supply voltage fed to the motor 110. The torque M1, which has been measured using a test load of 50%+P %, together with the torque caused by the counterweight in the upward direction, produces an upwards driving force F. Acting on the brakes, this force F has an absolute value equal to the downward force produced by a car load of 100%+P %. Thus, by combining the upward torque M1 produced by the motor and the upward torque caused by the counterweight when the car is empty, it is possible to apply to the brakes a force that corresponds to a car overload.

In step 216, a check is made to establish whether the car has moved. The expression 'moved' here refers to a significant or measurable movement. The movement can be measured e.g. from the tachometer of the motor 110 or from a motion measuring device 115 connected to the motor. The movement can also be measured from the elevator car by means of optical cells and light sources mounted as their counterparts in the elevator shaft. Even a very small motion, e.g. 5–10 cm, may be regarded as a relevant car movement. The motion measuring device 115 indicates the movement to the control system 114 via a cable 116. If the elevator car 102 has moved, the procedure will go on to step 218. If the elevator car 102 has not moved, the procedure resumes from step 208, awaiting the next test.

In step 218, a notice is given to a malfunction monitoring center, e.g. by transmitting a message from the control system 114 to the data system of a maintenance center, because the brake of the elevator has slipped under a torque corresponding to an overloaded elevator car. At this stage the elevator is generally shut off.

In an embodiment of the invention, the above-described method is applied to a system provided with several separate brakes in such manner that brake testing steps 212–216 are repeated separately for each brake. While each brake is being tested, the other brakes are temporarily shut off.2

Figure 3:
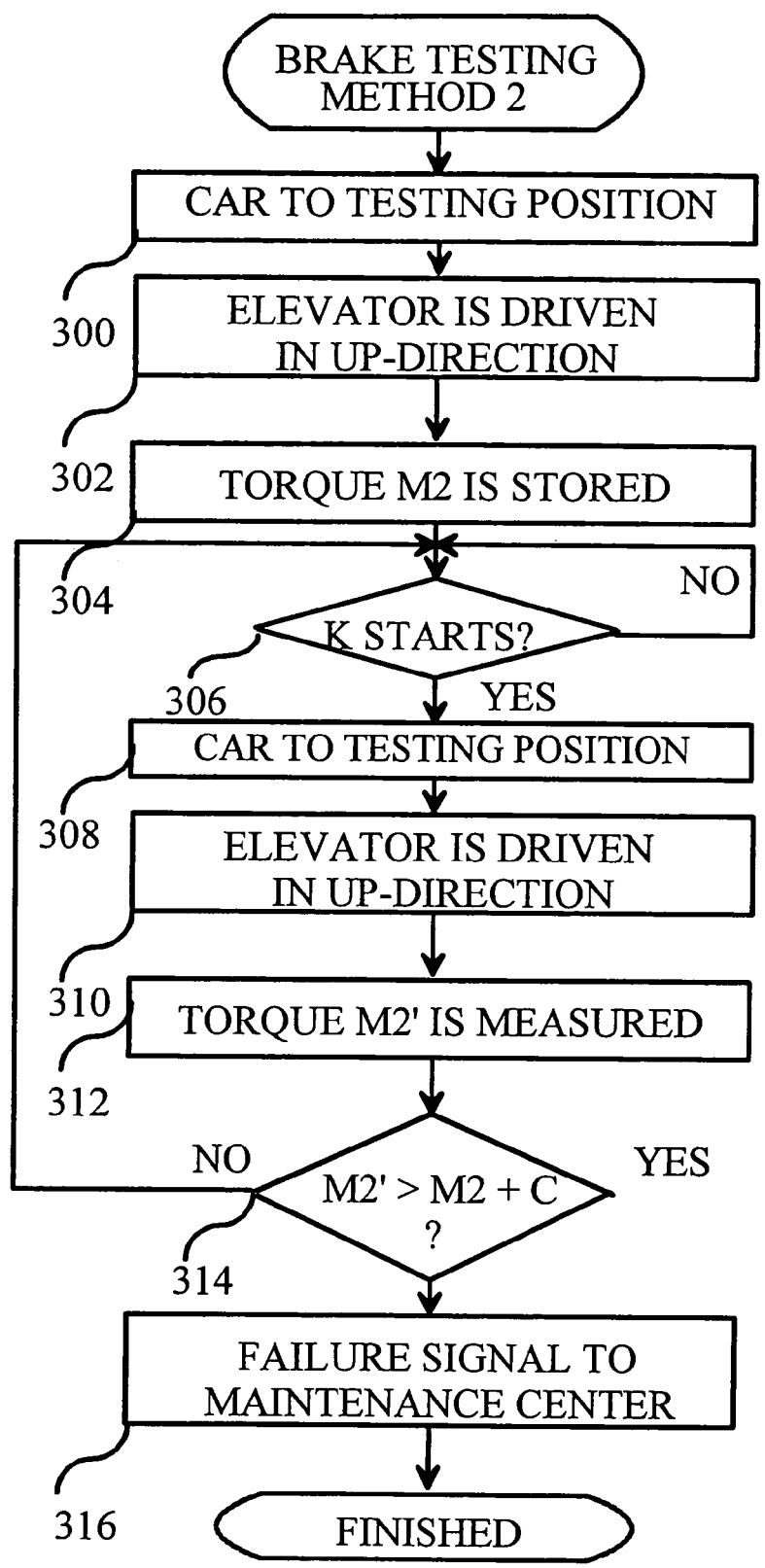
FIG. 3 represents a method according to the present invention for checking drag of the brakes of an elevator machine.

FIG. 3 presents an example of an embodiment according to the present invention for checking whether the brakes of an elevator machine are dragging. In an embodiment of the invention, the elevator system to be tested is as illustrated in FIG. 1. Brake drag is checked as part of the method according to FIG. 2, but for the sake of clarity it is described by referring to a separate figure.

In step 300, the elevator car is driven to a testing position, e.g. to the bottom floor. In step 302, the elevator is driven in the upward direction and the torque required to set the elevator car in motion is measured. This measured torque value is designated by variable M2. This torque value M2 is stored in the memory of the elevator control system 114 in step 304. In an embodiment of the invention, the measured torque value M2 is compared to the basic value stored beforehand in the control system 114. The measured torque value M2 must not differ significantly from this basic value. The torque value M2 may differ significantly from the basic value e.g. if the brake of the elevator was in the closed state during the measurement. If the value M2 differs significantly from the basic value, then the measurement is regarded as a failure and the start-up process can not be continued.

The above-mentioned torque M2 can be calculated either in conjunction with the manufacture of the elevator apparatus, during installation of the elevator apparatus in the client's premises or in conjunction with a renewal of the electrification system of an elevator apparatus already installed in the client's premises. It is possible to calculate the torque in conjunction with manufacture if it can be established that for example the weight of the elevator car 102 and counterweight 104 and the transmission properties of the motor 110, the axles 107–108 and the traction sheave 106 will remain sufficiently unchanged when installed in the client's premises. Calculation of the torque during start-up in the client's premises is necessary especially if a new control system 114 and a new motor 110 are installed in an existing system consisting of an elevator shaft, an elevator car and a counterweight. Especially in conjunction with modernization of the electrification system of an old elevator machine it is important to make sure that the brake of the elevator is in the released state during the measurement.

In step 306, a check is carried out to establish whether the elevator car 102 has been started K times. The number K may be e.g. 1000 or some other corresponding number which represents the prescribed interval between automatic tests of brake condition. The number K may be the same as the number N mentioned in connection with the description of FIG. 2, in which case both tests are carried out in the same connection. The prescribed period can be input to the control system 114 either at factory or in connection with maintenance. In an embodiment of the invention, the test can also be carried out at certain intervals based e.g. on a timer or a clock device connected to the control system 114. If it is established in step 306 that the car has not yet been started K times, the procedure is resumed again from step 306, awaiting the next start. After K starts have been performed, the procedure goes on to step 308. In an embodiment of the invention, an additional check is carried out to establish whether the elevator car is free of passengers.

In step 308, the doors of the elevator car are closed and the elevator car is driven to a testing position, e.g. to the lowest floor. In step 310, the elevator is driven in the upward direction and in step 312 the torque M2' required to set the elevator car in motion is measured. In step 314, the previously measured and stored torque M2 is compared to the newly measured torque M2'. If the difference between the absolute values of M2 and M2' exceeds the value C, where C is e.g. a constant value defined in the control system 114, then the difference is significant. If M2 and M2' differ significantly, then probably the brake of the elevator is dragging. This may cause strain of the brake shoe such that the brake no longer holds when the elevator has stopped at a landing. If it established in step 314 that the values M2 and M2' differ significantly, then the procedure will go on to step 316, in which a failure signal is transmitted to the maintenance center. In an embodiment of the invention, in step 316 the elevator is disabled until the brake is correctly adjusted.

The invention is not limited to the embodiment examples described above; instead, many variations are possible within the scope of the inventive concept defined in the claims.

The method and arrangement of the invention are characterized by what is disclosed in the characterization parts of claims 1 and 7. Other embodiments of the invention are characterized by what is disclosed in the other claims. Inventive embodiments are also presented in the description part of the present application. The inventive content disclosed in the application can also be defined in other ways than is done in the claims below. The inventive content may also consist of several separate inventions, especially if the invention is considered in the light of explicit or implicit subtasks or in respect of advantages or sets of advantages achieved. In this case, some of the attributes contained in the claims below may be superfluous from the point of view of separate inventive concepts.

It is obvious to the person skilled in the art that the invention is not limited to the examples described above, in which the invention has been described by way of example, but that different embodiments of the invention are possible within the scope of the inventive concept defined in the claims presented below.

The invention claimed is:

1. A method for testing the condition of the brakes of an elevator, characterized in that the method comprises the following steps:
    a test weight is set to apply to the drive machine of the elevator to measure a first torque required for driving the elevator car in the upward direction;
    at least one of the brakes of the elevator is closed;
    the empty elevator car is driven in the upward direction with the force of the aforesaid first torque;
    a check is carried out to detect movement of the elevator car; and
    if a movement of the elevator car is detected, then the at least one brake of the elevator is regarded as defective.

2. A method according to claim 1, characterized in that the method comprises the following steps:
    a second torque required for driving the elevator car in the upward direction in a defined start-up situation is measured;
    a third torque for moving the elevator car in the upward direction is measured at prescribed intervals;
    the aforesaid second torque is compared to the aforesaid third torque; and
    if the aforesaid third torque exceeds the aforesaid second torque by a threshold value, then the elevator is regarded as defective.

3. A method according to claim 2, characterized in that the testing of the brakes is performed automatically at prescribed intervals when the elevator is empty.

4. A method according to claim 3, characterized in that the aforesaid prescribed interval corresponds to a certain number of starts of the drive machine.

5. A method according to claim 1, characterized in that the aforesaid drive machine is electronically adjustable.

6. A method according to claim 2, characterized in that the aforesaid threshold value can be defined in the control system of the elevator.

7. A system for testing the condition of the brakes of an elevator, characterized in that the system comprises:
    a control system for measuring a first torque required to drive the elevator in the upward direction in a defined start-up situation, storing the aforesaid first torque, closing the brake of the elevator, driving the elevator car in the upward direction with the force of the aforesaid first torque; and
    measuring means for checking movement of the elevator car, said means being connected to the control system.

8. A system according to claim 7, characterized in that the system comprises:
    a control system for measuring a second torque required to drive the elevator in the upward direction in a defined start-up situation, measuring a third torque required to drive the elevator car in the upward direction in a testing situation, storing the aforesaid second and third torques, comparing the aforesaid second and third torques and indicating a defective condition of the elevator if the third torque exceeds the aforesaid second torque by a threshold value.

9. A system according to claim 8, characterized in that the aforesaid threshold value can be defined in the control system of the elevator.

10. A system according to claim 7, characterized in that the aforesaid testing situation is repeated automatically at prescribed intervals when the elevator is empty.

11. A system according to claim 10, characterized in that the aforesaid prescribed interval corresponds to a certain number of starts of the drive machine.

12. A system according to claim 7, characterized in that the drive machine of the elevator is electronically adjustable.

* * * * *

UNITED STATES PATENT AND TRADEMARK OFFICE
CERTIFICATE OF CORRECTION

PATENT NO.        : 7,222,698 B2
APPLICATION NO.   : 11/451543
DATED             : May 29, 2007
INVENTOR(S)       : Ari Hänninen Page 1 of 1

It is certified that error appears in the above-identified patent and that said Letters Patent is hereby corrected as shown below:

Title Page, Column 1, insert:

--(30) Foreign Application Priority Data
FINLAND 20040022 JANUARY 9, 2004--

Signed and Sealed this

Eighteenth Day of September, 2007

JON W. DUDAS
*Director of the United States Patent and Trademark Office*